Oct. 12, 1971     W. H. ARMSTRONG     3,611,451
PLUMBING MODULE
Filed Dec. 8, 1969     3 Sheets-Sheet 1
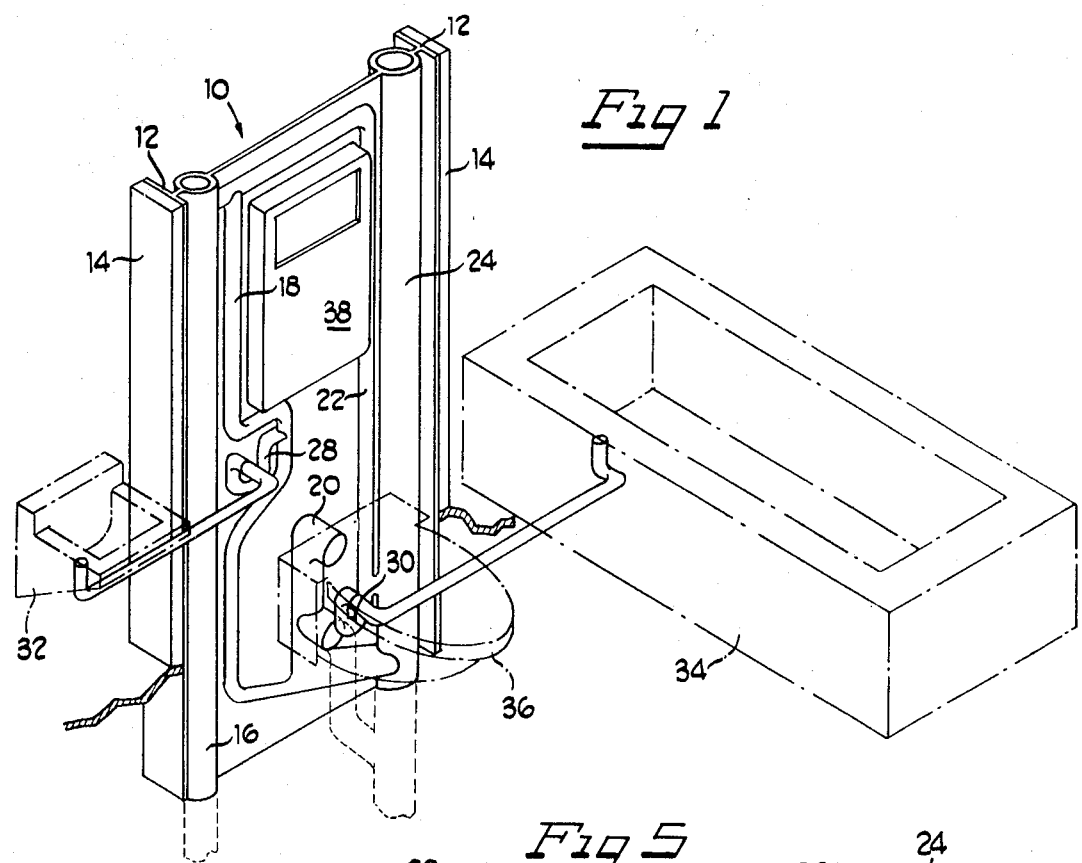
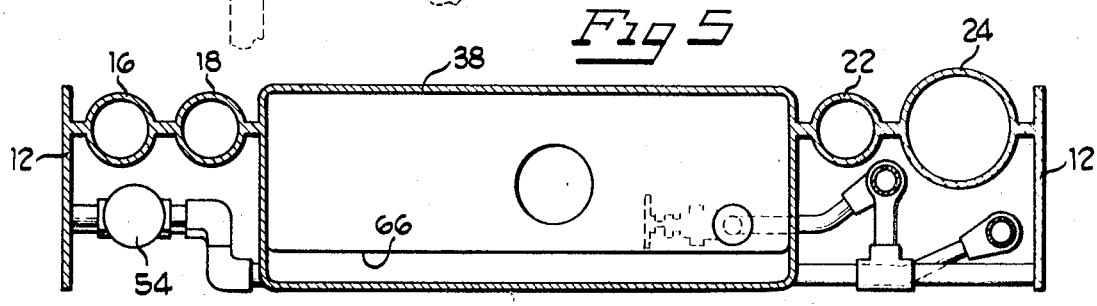
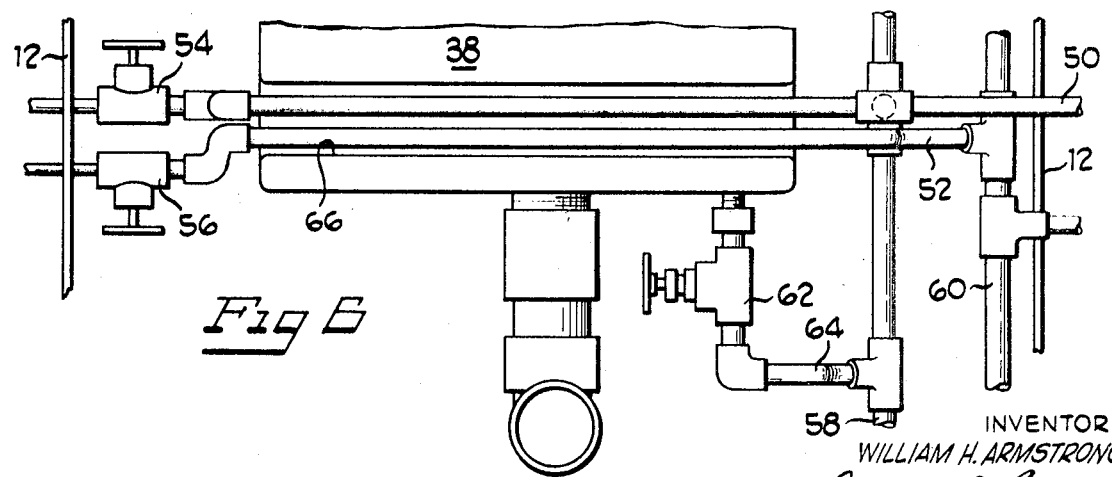
INVENTOR
WILLIAM H. ARMSTRONG
BY *Aubrey L. Burger*
ATTORNEY

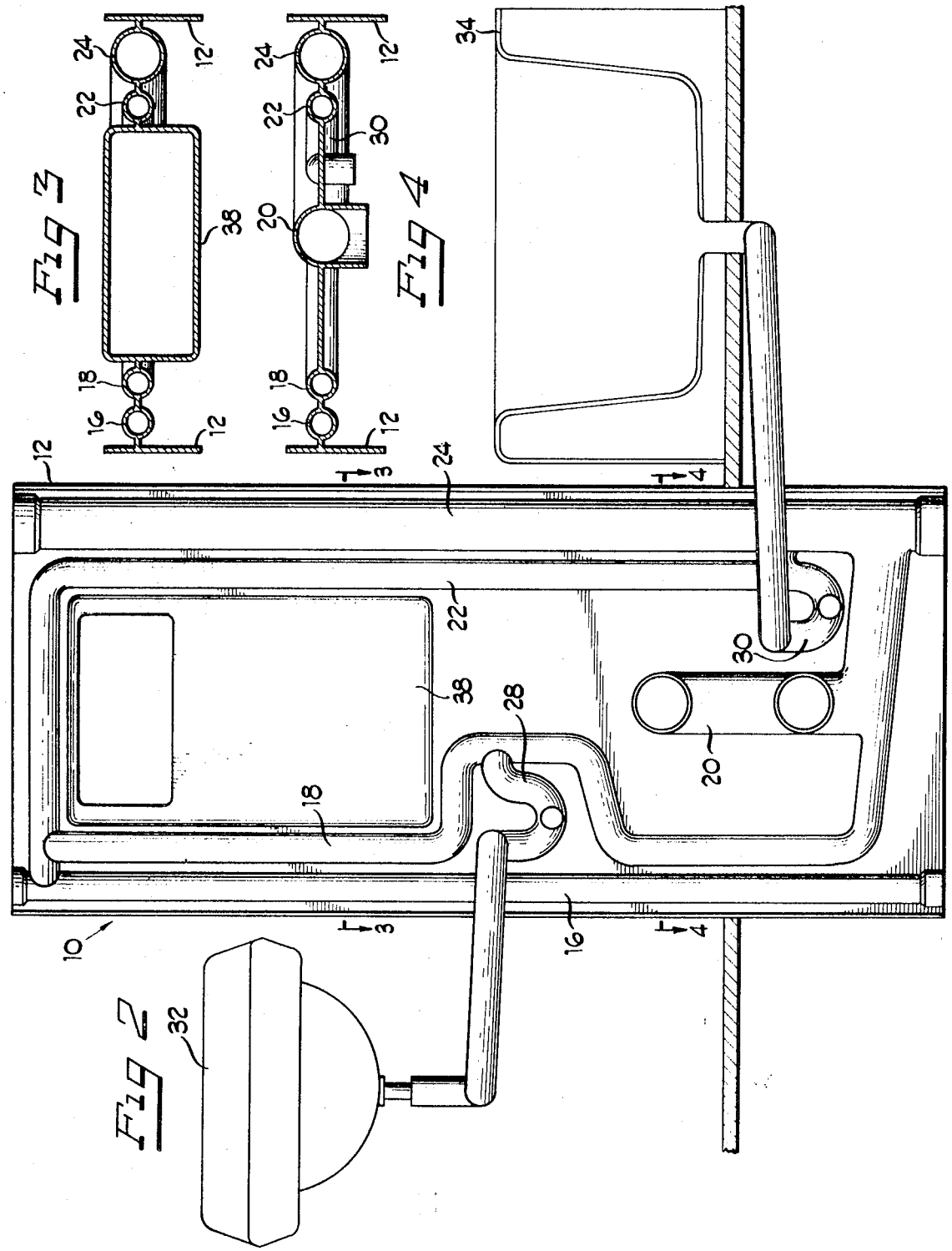

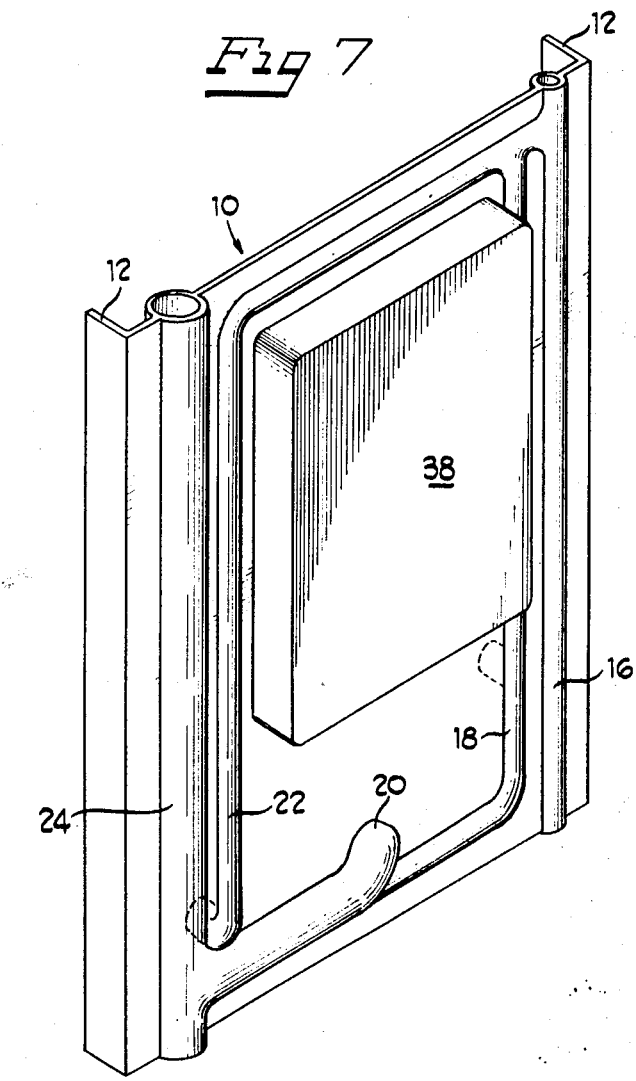

United States Patent Office 3,611,451
Patented Oct. 12, 1971

3,611,451
PLUMBING MODULE
William H. Armstrong, Bloomfield Hills, Mich., assignor to Borg-Warner Corporation, Chicago, Ill.
Filed Dec. 8, 1969, Ser. No. 883,085
Int. Cl. E03c 1/00
U.S. Cl. 4—191
6 Claims

ABSTRACT OF THE DISCLOSURE

A prefabricated plumbing module or assembly which is an integral molded unit adapted to be installed between studding or other wall constructions of a building or the like and having interconnected piping for connection with the waste and drain fittings of a water closet bowl, a lavatory and a bath tub or shower (or combination thereof) and for connection with a vent and stack and to a waste system or sewer. The water closet tank can be integrally molded in the unit.

BACKGROUND OF THE INVENTION

Conventional plumbing includes numerous pipes, joints and fittings which are installed in the walls of a building during its construction. Generally, the pipes are cut on the job and fitted into a desired location by one or more plumbers; at any rate, such an installation is costly and considerable time must be expended in cutting pipe, joining pipes, testing the joints and installing the system.

More recently attempts have been made to reduce plumbing costs in buildings by using a plumbing core or tree, as for example where all or nearly all the pipes are contained in a common wall and kitchens and baths are connected to the common system. These installations use prefabricated assemblies of pipe, joints and the like which must be hand made in a conventional manner, i.e., the pipe must be cut to length and joined as desired.

THE INVENTION

According to the invention, there is provided an integral, molded plumbing module or assembly having interconnected pipes with appropriate openings for connecting to the various waste and discharge lines of plumbing fixtures, which also include pipes for connection with the required vent and stack pipes and to a sewer or other waste system in a building or other structure. The water closet tank and the various traps which may be required can, if desired, be incorporated or formed in the module. The assembly is a series or pipes, containers and webs adapted to be installed, as by means of edge flanges, between studding in a building or other structure. The various pipes from the plumbing fixtures are suitably joined to the respective openings by a cement bonding agent, mechanical means or the like, the assembly being preferably made from a suitable plastic.

The assembly can be made by preforming two halves, i.e., webs and shaped areas, and joining the halves together. Other methods of manufacture may be employed. At any rate, in a multiple story building, the assemblies can be stacked, one above the other, by joining their vent and stack pipes. Such a unit is ideal for incorporation into trailers and the like where prefabricated units save space and reduce costs. It can be plumbed from either side or either end, as is necessary.

THE DRAWINGS

FIG. 1 is an isometric view of one embodiment of the invention, shown in solid lines, as attached to the studs of a building, and also showing bath fixtures attached thereto in broken lines;

FIG. 2 is a front elevational view of the embodiment of FIG. 1;

FIG. 3 is a sectional view taken on lines 3—3 of FIG. 2;

FIG. 4 is a sectional view taken on lines 4—4 of FIG. 2;

FIG. 5 is a sectional view, similar to FIG. 3, but illustrating one disposition of hot and cold water lines associated with the plumbing module;

FIG. 6 is a partial front elevational view of the modification of FIG. 5; and

FIG. 7 is an isometric view of another embodiment of the invention.

THE PREFERRED EMBODIMENTS

Looking first to FIGS. 1 to 4, there is illustrated an integral plumbing module or assembly, generally identified as 10, having edge flanges 12 for connection to the studs 14 of building, either residential or commercial or to ribs in the wall units of trailers or the like or to other building construction. In residential and commercial buildings, such units are adaptable for stacking, one above the other, for the height of the building and such an array will have a common vent and stack and a waste pipe for connection with the sewer or other waste system.

The module 10, in addition to the side flanges includes a plurality of interconnected pipes 16, 18, 20, 22 and 24. The pipe 16 is a common vent or stack and is connected by suitable means to a vent or stack pipe (not shown) which extends from the roof of the building in which the plumbing wall is used while the pipe 24 is a common waste pipe and is adapted to be connected to a sewer or other waste system in any conventional manner.

The pipes 16, 18, 20, 22 and 24, as well as the edge flanges of the module are joined by an integrally formed web 26.

Integrally formed traps 28 and 30 communicating with the pipes 18 and 22 respectively, for connection to the outlets of a lavatory 32 and a bath tub 34 (or shower stall if such is substituted for a tub) are also provided in the unit 10. The pipe 20 is connected to the water closet bowl 36 in the conventional manner. As an added feature, a water closet tank 38 is provided in the module for connection with the water closet bowl 36.

While this described embodiment is constructed with integral traps and for connection to a below-the-floor tub or shower drain, it is to be understood that a unit for connection to an above-the-floor tub or shower drain can be constructed, as shown in FIG. 7 in which the parts are identified with the same reference characters.

FIGS. 5 and 6 show a modification in which separate hot and cold water pipes are fitted with the module. Here the flanges 12 are provided with suitable openings for the passage of hot and cold water pipes 50, 52, to which appropriate valves 54, 56 are connected for controlling the flow of water to the lavatory. Other valves, not shown, can be included in spur lines 58, 60 for connection with the bath tub or shower stall, and a valve 62 is included in a spur line 64 for connection with the water closet bowl. It is noted that the water closet tank may be shaped, as at 66, for the passage of the water pipes from one side of the unit to the other.

While the invention has been described with reference to the illustrated embodiments, it is to be understood that other arrangements of integral pipes, webs and flanges can be used. For example, the module can be adapted to receive a flush mounted water closet bowl, if so desired. Other modifications within the scope of the appended claims will become apparent to one skilled in the art.

To construct such a module, two sheets of plastic, metal or the like, each molded to conform to a surface of the unit are suitably and hermetically sealed one to another. It is also possible to mold the module in its present form by using the rotational molding technique, or by using a flow molding technique. Regardless of the method by which the module is made, the arrangement is essentially the same.

What is claimed is:

1. A prefabricated plumbing assembly or module, comprising:
    an integrally formed unit of one material with interconnected pipes;
    one of said pipes being a common vent pipe and having an opening for connection with a plumbing vent stack;
    another of said pipes being a common waste pipe and having an opening for connection with a sewer or other waste system;
    other of said pipes each having an opening for connection to the waste outlet of a plumbing fixture and the like.

2. A prefabricated plumbing assembly or module as recited in claim 1, further comprising flanged edges for installing said assembly or module in a building construction and the like.

3. A prefabricated plumbing assembly or module as recited in claim 1 which is a molded plastic.

4. A prefabricated plumbing assembly or module, as recited in claim 1, further comprising webs joining said pipes.

5. A prefabricated plumbing assembly or module as recited in claim 1 further including integrally formed traps communicating with said connection for said plumbing fixtures.

6. A prefabricated plumbing assembly or module as recited in claim 1 in which said plumbing fixtures include a water closet bowl and further including an integrally formed water closet tank for connection with said water closet bowl.

References Cited

UNITED STATES PATENTS

| | | | |
|---|---|---|---|
| 2,645,783 | 7/1953 | Allen | 4—191 |
| 2,653,357 | 9/1953 | Sanders et al. | 4—2 |
| 2,787,027 | 4/1957 | Baker | 4—2 |
| 3,143,744 | 8/1964 | Greer | 4—192 |
| 3,221,454 | 12/1965 | Togni | 52—220 |
| 3,230,549 | 1/1966 | McMurtrie et al. | 4—2 |
| 3,245,185 | 4/1966 | Rowe | 52—220 X |
| 3,358,298 | 12/1967 | Beyerle | 4—211 |
| 3,360,008 | 12/1967 | Papale et al. | 52—220 X |
| 3,381,313 | 5/1968 | Rothmayr | 4—2 |

FOREIGN PATENTS

| | | | |
|---|---|---|---|
| 1,464,805 | 11/1965 | France | 4—2 |
| 871,510 | 3/1953 | Germany | 4—2 |
| 375,300 | 3/1964 | Switzerland | 4—2 |

HENRY K. ARTIS, Primary Examiner

U.S. Cl. X.R.

4—2; 52—220